DUAL MOS-FET CHOPPER-SUMMER CIRCUIT IN A CLOSED LOOP SERVO
Filed May 4, 1966
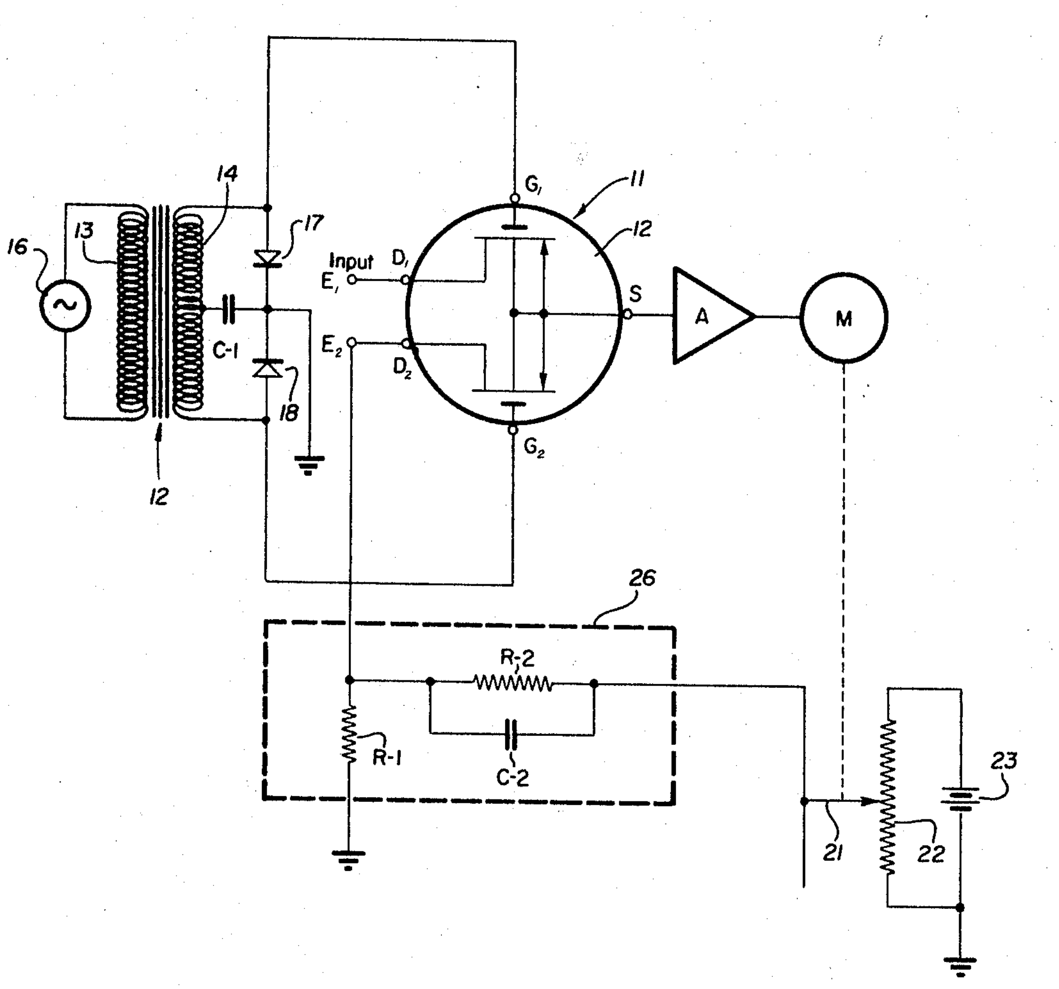
INVENTOR.
Clair E. Miller
BY [signature]
Attorneys United States Patent Office 3,454,850

Patented July 8, 1969

3,454,850

DUAL MOS-FET CHOPPER-SUMMER CIRCUIT IN A CLOSED LOOP SERVO

Clair Eugene Miller, Palo Alto, Calif., assignor to Dohrmann Instruments Company, San Carlos, Calif., a corporation of California Filed May 4, 1966, Ser. No. 547,498

Int. Cl. H02p *1/54, 5/46*

U.S. Cl. 318—18 4 Claims

ABSTRACT OF THE DISCLOSURE

Disclosed in a dual MOS-FET circuit which acts as a chopper and summing network in a closed loop servomotor control. The device includes a unique biasing network which consists of a smoothed full wave rectification of a portion of the chopping signal with means to superimpose this signal on the chopping signal as a D.C. bias for the chopper.

This invention relates to a solid state chopper and more particularly to a solid state chopper for use in a null balance potentiometric strip chart recorder.

In the past, mechanical choppers have been utilized in null balance potentiometric strip chart recorders. However, it has been found that use of such mechanical chopper has a number of disadvantages. Such choppers have been found to provide a source of trouble and, in addition, they have a higher inherent noise level.

In general, it is an object of the invention to provide a solid state chopper which overcomes the above-named disadvantages.

Another object of the invention is to provide a solid state chopper of the above character which can be utilized in place of a mechanical chopper without any modifications.

Another object of the invention is to provide a chopper of the above character which is relatively inexpensive.

Additional objects and features of the invention will appear from the following description in which a preferred embodiment is set forth in detail.

The drawing shows a circuit diagram of a solid state chopper incorporating the present invention utilized in circuitry for driving the pen system of a strip chart recorder.

In general, the solid state chopper consists of a metal oxide silicon type field effect transistor having first and second drains, first and second gates, and a source element. It also includes a center tapped transformer and a pair of opposing diodes which are connected to the ends of the transformer and to the gates of the transistor. A capacitor is connected between the diodes and the center tap of the transformer. In utilization of the solid state chopper in circuitry for driving the pen system of a strip chart recorder, one drain is connected to the input signal, whereas the other drain is connected to the feedback signal supplied from a potentiometer driven by the servomotor which is driven by the field effect transistor and which drives the pen means.

More particularly, as shown in the drawing, the solid state chopper with the associated electronics consists of a field effect transistor 11. It is preferably of the metal oxide silicon type such as type No. 2N3609 manufactured by General Micro Electronics, Inc., of Santa Clara, Calif. As is well known to those skilled in the art, such a transistor includes a pair of drains D1 and D2, a pair of gates G1 and G2, and a source S formed on a body 12. In such devices, there is an extremely high resistance from the drain to the source. However, if a negative voltage is applied to the gate relative to the source lead of approximately 4.5 volts, the device resistance from the drain to the source is reduced very substantially from approximately $10^{10}$ ohms to 400 or 500 ohms. Thus, if the voltage from the gate to the source is less than negative 4.5 volts, there is a high resistance from drain to source. When the voltage from the gate to the source is more negative than negative 4.5 volts, there is a low resistance from the drain to the source. The transistor 11, therefore, operates as two on-off switches. Thus, when a signal is supplied to the drains D1 and D2 180° out of phase with each other, one side is on and the other is off, and vice versa.

The transistor 11 is preferably mounted in a suitable package which is mounted upon an adapter to make it possible to interchange the present solid state chopper with a conventional mechanical chopper.

Means is provided for supplying the necessary turn-on voltages to the gates G1 and G2 and consists of a transformer 12 which is provided with a primary winding 13 and secondary winding 14. In order that the solid state chopper can be utilized for replacement of a conventional mechanical chopper, it is desirable that the solid state chopper operate off of the same voltage which is utilized in a mechanical chopper. With mechanical choppers it has been conventional to utilize 6.3 volts which can be the voltage supplied by the secondary winding 14 of the tranformer 11 which is connected to a suitable source of AC 16 such as 110 volts. In order to make the 6.3 volt winding effective for use with the transformer 11, the transformer winding 14 is biased to a negative 4.5 volts by use of a pair of diodes 17 and 18 which are connected to opposite ends of the winding 14, and the other ends are connected to ground as shown in the drawing with a capacitor C1 connected from the center tap of winding 14 to ground. This effectively places the center tap of the winding 14 at ground and the opposite ends at a −4.5 volts with respect to ground. With such an arrangement utilizing 60-cycle AC current, the gates G1 and G2 are 180° out of phase and one of the gates is going from ground to a −9 volts, whereas the other gate is going from a −9 volts to ground, and vice versa. The desired 4.5 volts is obtained on each side of the center tap because this is the peak value of one-half of 6.3 volts times the square root of 2. Essentially, the diodes provide a −4.5 volt bias across the capacitor C1.

The diodes 17 and 18 can be of any suitable type such as conventional germanium diodes; for example, type No. 1N34A manufactured by Sylvania.

The transistor 11, together with the biasing circuitry hereinbefore described, forms essentially a solid state chopper which can take the place of a mechanical chopper without any difficulty. In addition, the solid state chopper has a much longer life than any mechanical type chopper and also has lower inherent noise than a mechanical chopper. The solid state chopper is capable of comparing the voltages E1 and E2 applied to the drains D1 and D2. In other words, it is capable of summing the same to provide the sum to an amplifier A which drives a servomotor M. The servomotor M is capable of driving any desired device, as for example, a pen (not shown) of a strip chart recorder. In addition, the motor M drives a wiper 21 of a potentiometer 22. The potentiometer 22 is connected across a suitable source of power such as a battery 23 so that, dependent upon the position of the wiper, an error signal is supplied to a servo-compensating network 26. The servo-compensating network consists of a resistor R1 connected to ground and having the other end connected to a resistor R2 which has its other end connected to the wiper 21 of the potentiometer. The capacitor C2 is connected in parallel across the resistor R2. The output of this compensating network supplies an error signal E2 to the drain D2. This signal E2 is compared with the signal E1 and the difference between the same is supplied to the amplifier which contains operation of the motor until the error signal E2 is equal to the input signal E1 to establish a null balance position. The motor M and the potentiometer 22 will remain in this position until the input signal changes.

It is apparent from the foregoing that there has been provided a new and improved solid state chopper which can be utilized as a replacement for a mechanical chopper without any alteration in circuitry and which is particularly useful in circuitry for strip chart recorders.

I claim:

1. In a solid state chopper, a metal oxide silicon type field effect transistor having first and second drains and first and second gates and a common source, means for biasing the gates, said means for biasing the gates including a center-tapped transformer winding having opposite ends respectively connected to said first and second gates, a pair of opposed diodes connected to said opposite ends of said winding, and a capacitor connected between the center tap of said winding and between said pair of diodes.

3. A chopper as in claim 1 wherein one of said drains is connected to ground and wherein said ends of the diodes connected to the capacitor are connected to ground.

3. A chopper as in claim 1 wherein the voltage between the opposite ends of said winding is approximately 6.3 volts.

4. In a circuit of the character described, a metal oxide silicon type field effect transistor having first and second drains, first and second gates and a source, means for biasing the gates including a center-tapped transformer winding having opposite ends connected to the gates, a pair of interconnected opposing diodes connected to the ends of the transformer, and capacitor means connected between the two diodes, an amplifier having an input and an output, means connecting the input of the amplifier to the source, a motor, means connecting the output of the amplifier to the motor, a potentiometer, means connecting the potentiometer to the motor so that the potentiometer is driven by the motor, and means for supplying a source of voltage across said potentiometer and means connected to the wiper of the potentiometer for supplying the signal from the potentiometer to one of the drains of the transistor, the other of the drains of the transistor being adapted to receive an input signal, said transistor serving to sum the input signal and the signal from the potentiometer and to supply the difference to the amplifier.

References Cited

UNITED STATES PATENTS

| | | | |
|---|---|---|---|
| 1,985,352 | 12/1934 | Numans | 330—123 |
| 2,881,332 | 4/1959 | Jensen | 307—240 X |
| 2,938,174 | 5/1960 | Bulleyment. | |
| 3,161,454 | 12/1964 | Cann. | |
| 3,281,718 | 10/1966 | Weberg | 307—251 X |

ORIS L. RADER, *Primary Examiner.*

THOMAS E. LYNCH, *Assistant Examiner.*

U.S. Cl. X.R.

307—240, 251; 318—28; 330—9, 38